(12) United States Patent  
Lacy

(10) Patent No.: US 6,510,369 B1
(45) Date of Patent: Jan. 21, 2003

(54) RESIDENTIAL LOAD SHEDDING

(75) Inventor: Robert A. Lacy, Scotia, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/379,655

(22) Filed: Aug. 24, 1999

(51) Int. Cl.$^7$ .............................................. G05D 17/00
(52) U.S. Cl. ..................................................... 700/295
(58) Field of Search ............................... 700/297, 295, 700/296; 307/66

(56) References Cited

U.S. PATENT DOCUMENTS

| 4,202,933 A | | 5/1980 | Reiser et al. | |
|---|---|---|---|---|
| 4,217,646 A | * | 8/1980 | Caltagirone et al. | 165/205 |
| 4,251,736 A | | 2/1981 | Coleman | |
| 4,337,401 A | * | 6/1982 | Olson | 307/39 |
| 4,551,812 A | * | 11/1985 | Gurr et al. | 307/35 |
| 4,644,320 A | * | 2/1987 | Carr et al. | 340/310.06 |
| 4,771,185 A | * | 9/1988 | Feron et al. | 307/35 |
| 4,961,151 A | * | 10/1990 | Early et al. | 180/65.8 |
| 5,432,710 A | * | 7/1995 | Ishimaru et al. | 705/412 |
| 5,477,091 A | * | 12/1995 | Fiorina et al. | 307/26 |
| 5,534,734 A | * | 7/1996 | Pugh et al. | 307/38 |
| 5,754,445 A | * | 5/1998 | Jouper et al. | 700/276 |
| 5,880,536 A | | 3/1999 | Mardirossian | |
| 5,880,677 A | * | 3/1999 | Lestician | 307/17 |
| 6,067,482 A | * | 5/2000 | Shapiro | 307/64 |
| 6,311,105 B1 | * | 10/2001 | Budike, Jr. | 700/291 |

* cited by examiner

Primary Examiner—Thomas Black
Assistant Examiner—Edward F. Gain, Jr.
(74) Attorney, Agent, or Firm—Trop, Pruner & Hu, P.C.

(57) ABSTRACT

A system includes a fuel cell subsystem, switches and a controller. The fuel cell subsystem is adapted to provide power that is capable of being consumed by residential loads, and the fuel cell subsystem is sized to provide power up to a first power threshold that is less than a maximum power threshold that is capable of being consumed by the residential loads. The controller is adapted to determine the power that is consumed by the residential loads and based on the determined power, operate the switches to selectively regulate electrical connections between the residential loads and the fuel cell subsystem to keep the power approximately below the first power threshold.

36 Claims, 7 Drawing Sheets

RESIDENTIAL LOAD SHEDDING

BACKGROUND

The invention relates to residential load shedding.

A typically U.S. house is wired with the capacity to consume approximately 24 kilowatts (kW) of electrical power from an electrical utility company. However, the typical house consumes a much lower annual average power near approximately 1 kW. In order to consume 24 kW of power, nearly all of the electrical appliances and devices in the house would have to be turned on at the same time.

Conventionally, for purposes of receiving electrical power, the house is connected to a power grid that communicates electricity from one or more electrical power plants (hydroelectric or nuclear power plants, for example). However, in the near future, the house may receive partial or total power from its own fuel cell system.

For purposes of generating power, the fuel cell system includes fuel cells that are electrochemical devices that convert chemical energy produced by reactions directly into electrically energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions may be described by the following equations:

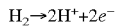

at the anode of the cell, and

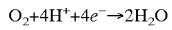

at the cathode of the cell.

Because a single fuel cell typically produces a relatively small voltage (around 1 volt, for example), several serially connected fuel cells may be formed out of an arrangement called a fuel cell stack to produce a higher voltage. The fuel cell stack may include different plates that are stacked one on top of the other in the appropriate order, and each plate may be associated with more than one fuel cell of the stack. The plates may be made from a graphite composite material and include various channels and orifices to, as examples, route the above-described reactants and products through the fuel cell stack. Several PEMs (each one being associated with a particular fuel cell) may be dispersed throughout the stack between the anodes and cathodes of the different fuel cells. The anode and the cathode may each be made out of an electrically conductive gas diffusion material, such as a carbon cloth or paper material, for example.

A fuel cell system typically is sized to efficiently provide a predefined range of output power. In this manner, components of the fuel cell system, such as electrical devices (electrical motors for pumps and blowers, for example) and non-electrical devices (valves, for example), may be sized to produce the predefined range of output power. If the fuel cell system is sized to provide the maximum power (24 kW, for example) that may be consumed by the average house, then the fuel cell system may suffer from inefficiency at the much lower output power that is typically consumed by the house. Additionally, the base cost of such a fuel cell system may be higher due to the system components that are designed to support a larger power output.

SUMMARY

In one embodiment of the invention, a system includes a fuel cell subsystem, switches and a controller. The fuel cell subsystem is adapted to provide power that is capable of being consumed by residential loads, and the fuel cell subsystem is sized to provide power up to a first power threshold that is less than a maximum power threshold that is capable of being consumed by the residential loads. The controller is adapted to determine the power that is consumed by the residential loads and based on the determined power, operate the switches to selectively regulate electrical connections between the residential loads and the fuel cell subsystem to keep the power approximately below the first power threshold.

Advantages and other features of the invention will become apparent from the following description, from the drawing and from the claims.

DETAILED DESCRIPTION

Figure 1:
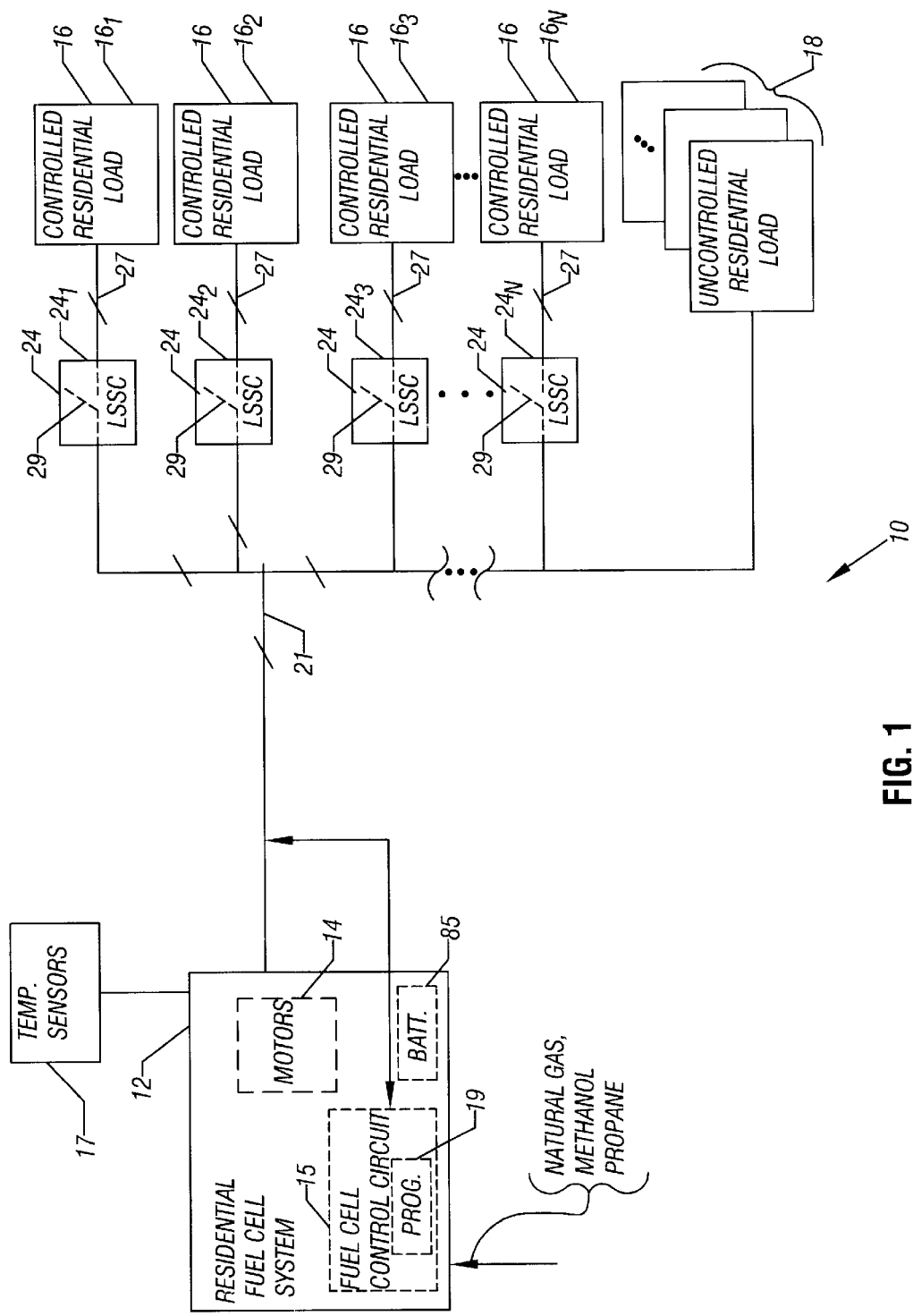
FIG. 1 is a schematic diagram of a residential electrical system according to an embodiment of the invention.

Referring to FIG. 1, an embodiment 10 of a residential electrical system in accordance with the invention includes controlled residential loads 16 (controlled residential loads 16$_1$, 16$_2$ . . . 16$_N$, as examples) and uncontrolled residential loads 18 that receive power from a fuel cell system 12 (of the residential electrical system 10). The controlled residential loads 16 may be, as examples, appliances (a refrigerator and/or an electric oven, as examples) and/or other electricity consuming devices. The components of the fuel cell system 12, such as flow control motors 14, valves, etc. are sized to produce a maximum output power that is below the maximum power that may be collectively consumed by the residential loads 16 and 18. To ensure that the fuel cell system 12 is not overloaded, a fuel cell control circuit 15 (of the fuel cell system 12) is designed to monitor the output power of the fuel cell system 12 and shed the appropriate controlled loads 16 to regulate the output power.

Unlike the controlled residential loads 16, the uncontrolled residential loads 18 may not be shed from the electrical system 10 for purposes of reducing the power output of the fuel cell system 12. Instead, each uncontrolled residential load 18 is coupled to the fuel cell system 12 by wiring of the house that may be disconnected from the fuel cell system 12 only by a standard circuit breaker panel switch (not shown). In this manner, the circuit breaker panel switch may be manually turned off or may automatically turn off if the current through its associated house circuit exceeds a predefined level. Similar to the controlled residential loads 16, the uncontrolled residential loads 18 may be, as examples, appliances and/or other electricity consuming devices.

A technique of storing electricity, such storing energy in a storage battery 85 (a lead acid battery, for example), may be utilized for extending the peak power output capability of the fuel cell system 12. This way the maximum peak power output of the fuel cell system 12 is equal to the combined peak outputs of both the battery 85 and the fuel cell system 12. The battery 85 provides extra power capability for limited periods of time based on its capacity and state of charge. Load shedding may be used to prevent completely discharging the battery 85 by limiting peak load based not only on the peak output of the fuel cell system 12, but also taking into consideration the battery's state of charge. During periods of low load (i.e., low output power), the battery is recharged using the fuel cell system's excess capacity.

Figure 6:
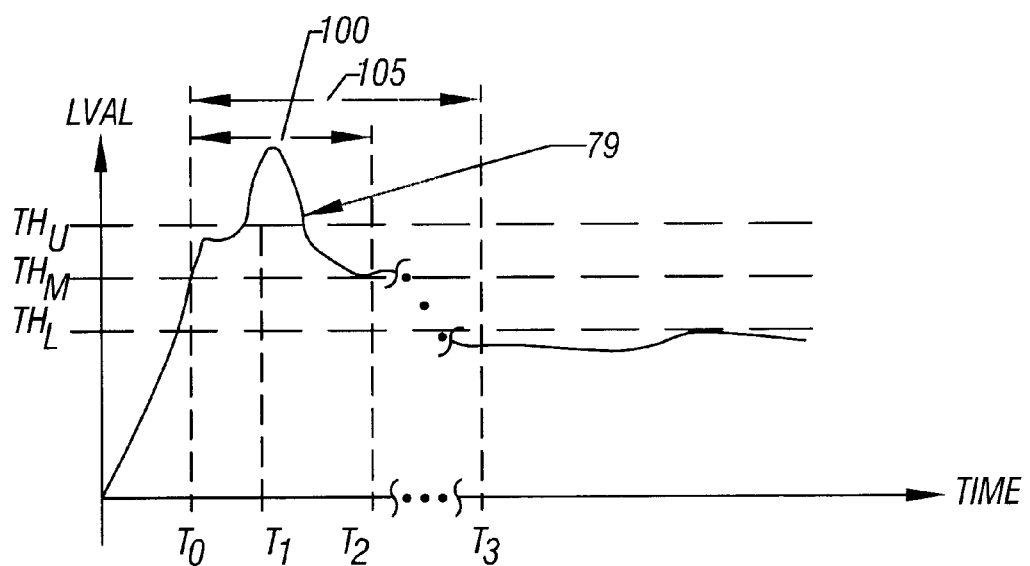
FIG. 6 is a power versus time plot.

The fuel cell control circuit 15 may shed the controlled residential loads 16 from the electrical system 10 based on the output power (of the fuel cell system 12) that is depicted by an exemplary waveform 79 in FIG. 6. In some embodiments, the fuel cell control circuit 15 regulates the total load on the fuel cell system 12 to satisfy the following criteria: 1. The output power does not exceed a maximum power threshold level (called $TH_U$ (see FIG. 6)); 2. The output power does not exceed a middle power threshold level (called $TH_M$) for a time interval that is longer than a predefined window 100 of time; and 3. The output power does not exceed a lower power threshold level (called $TH_L$) for a time interval that is longer than a predefined window 105 of time. The window 105 is longer than the window 100, as depicted in FIG. 6.

Although the fuel cell system 12 may be sized to provide an output power up to the $TH_L$ lower power threshold level, the ability of the fuel cell system 12 to temporarily furnish power above this level due to the battery 85. In this manner, as further described below, the fuel cell system 12 may use the battery 85 to temporarily boost the output power when the output power exceeds the $TH_L$ lower power threshold level. However, because the energy that is stored by the battery 85 is limited, the fuel cell system 12 may monitor the remaining energy that is stored in the battery 85 and set the durations of the windows 100 and 105 accordingly. Thus, the durations of the windows 100 and 105 are dynamic and are a function of how long the battery 85 has recharged between successive power surges. As a more specific example, at a particular moment, the duration of the window 100 may be approximately one half of a second (as an example), and the duration of the window 105 may be approximately 30 seconds (as an example). However, the fuel cell system 12 may change the window durations as needed in accordance with the available energy that is stored in the battery 85.

In some embodiments, to accomplish the above-described regulation criteria, the fuel cell control circuit 15 may operate switches 29 (see FIG. 1) in the following manner to shed the controlled residential loads 16. If the fuel cell control circuit 15 determines that the output power of the fuel cell system 12 is above the $TH_U$ upper power threshold level, then the fuel cell control circuit 15 immediately switches off one or more of the controlled residential loads 16 to return the output power below the $TH_U$ upper power threshold level. If the output power rises above the $TH_M$ middle power threshold level, then the fuel cell control circuit 15 sheds one or more of the controlled residential loads 16 to bring the power level under the $TH_M$ middle power threshold level within the window 100. If the output power is above the $TH_L$ lower power threshold level, then the fuel cell control circuit 15 sheds one or more of the controlled residential loads 16 to bring the output power below the $TH_L$ lower power threshold level within the window 105.

As depicted in FIG. 1, each switch 29 is located between the power lines 21 and a different set of power lines 27 that extend to an associated controlled residential load 16. Therefore, if the fuel cell control circuit 15 determines that the output power needs to be reduced, then the fuel cell system 12 sheds the appropriate controlled residential load(s) 16 by opening one or more of the switches 29 to disconnect the controlled residential load(s) 16 from the electrical system 10 (and from the fuel cell system 12). The uncontrolled residential loads 18 may be directly connected to the power lines 21.

Each switch 29 may be part of a load sense and switch circuit 24 (circuits $24_1$, $24_2$, $24_3$, ... $24_N$, as examples) that is associated with the same controlled residential load 16 as the switch circuit 29. In some embodiments, each switch circuit 24 may provide various indications to the fuel cell control circuit 15. For example, the circuit 24 may communicate an indication of whether its associated controlled residential load 16 is turned on or off and may communicate, for example, an indication of the power that is currently being consumed by its associated controlled residential load 16. Therefore, for example, if the fuel cell control circuit 15 needs to connect one of the controlled residential loads 16, the fuel cell control circuit 15 may communicate with the associated circuit 24 to determine the most recent historical power consumption profile of the associated controlled residential load 16 for purposes of ensuring that turning on this controlled residential load 16 does not exceed the $TH_L$ lower power threshold level. For example, the circuit 24 may track the maximum power level that has been consumed by the associated controlled residential load 16 during the last hour (for example) and communicate this maximum power level to the fuel cell control circuit 15. Other arrangements are possible.

The fuel cell control circuit 15 may, in some embodiments, use the indications from the circuits 24 to identify the connected controlled residential loads 16 that are connected and are not currently consuming power, i.e., to identify which controlled residential loads 16 are turned off. In this manner, the fuel cell control circuit 15 may shed these identified controlled residential loads 16 to prevent a momentary overload that may occur if the identified controlled loads 16 are turned on.

Figure 2:
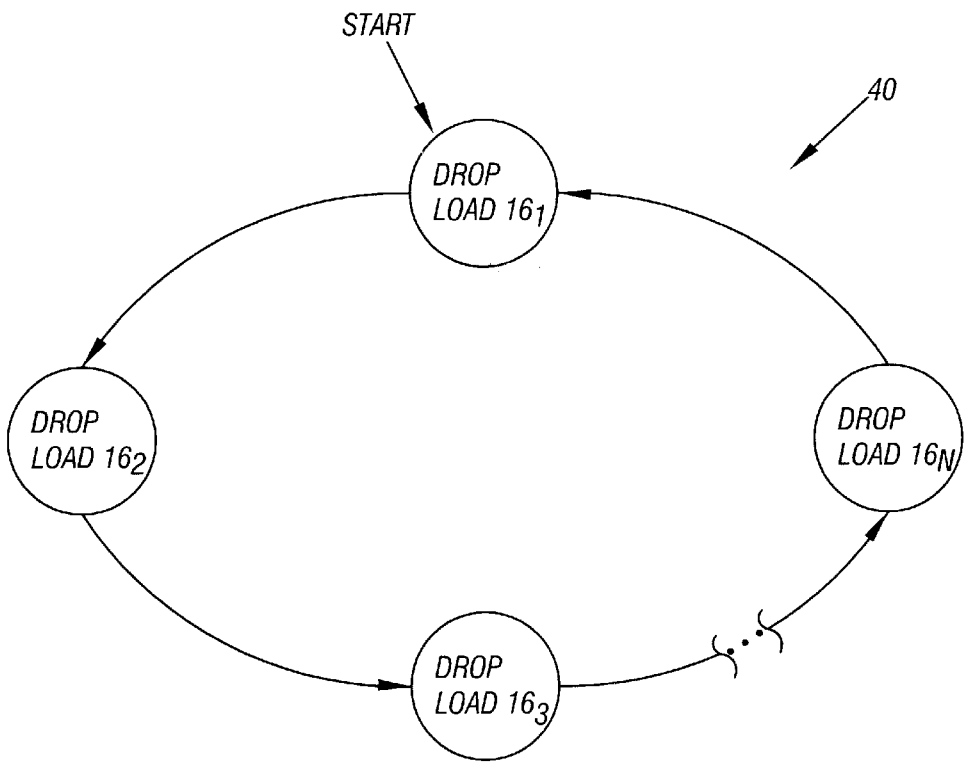
FIG. 2 is an illustration of a priority scheme for shedding loads of the electrical system of FIG. 1 according to an embodiment of the invention.

Referring to FIG. 2, the fuel cell control circuit 15 may follow a predefined priority scheme when shedding, or disconnecting, the controlled residential loads 16 to bring the output power within the specified range. For example, in some embodiments, the fuel cell control circuit 15 assigns a different priority level to each controlled residential load 16 and may use a round robin disconnection priority scheme 40 to select the next controlled residential load 16 that is to be disconnected from the electrical system 10 (and from the fuel cell system 12). As an example, in the disconnection priority scheme 40, the controlled residential loads 16 may have the following disconnection priority (according to the reference numbers of the controlled residential loads 16, as listed from the top to the bottom disconnection priority level in order): $16_1$, $16_2$, $16_3$, . . . $16_N$. Thus, the fuel cell control circuit 15 may disconnect the controlled residential load $16_1$ (assuming that the controlled residential load $16_1$ is connected) before disconnecting the controlled residential load $16_2$ (assuming that the controlled residential load $16_2$ is connected), as depicted in FIG. 2.

In some embodiments, the controlled residential loads 16 that consume more power may have a higher disconnection priority and therefore, may be disconnected before the other controlled residential loads 16. In some embodiments, if a particular controlled residential load 16 is associated with an electrical device/appliance that has a substantial potential energy, then the controlled residential load 16 is assigned a higher priority for shedding purposes.

For example, a high thermal mass is one type of potential energy that permits a particular electrical device/appliance to function after being disconnected and thus, the disconnection may go unnoticed inside the house. For example, one such device that has a high thermal mass (and substantial potential energy) is a hot water heater, as the hot water inside a tank of the hot water heater may remain hot for a substantial time after electricity to the water heater has been disconnected.

Similarly, an air conditioner may have a high thermal mass (and substantial potential energy) in that evaporation coils of the air conditioner may remain cold when a compressor (that is part of a controlled residential load 16) is turned off. The blower of the air conditioner may remain electrically connected to the system 10 (i.e., the blower is not part of the circuit that forms the controlled residential load 16 that is disconnected) to continue to blow air over the evaporation coils to produce cold air in the house. Therefore, disconnection of the compressor may go unnoticed for a substantial time. Other controlled residential loads 16 that may have a high thermal mass (and substantial potential energy) may be a heat pump, an oven, an electric dryer and a pool heater, as just a few examples.

Figure 8:
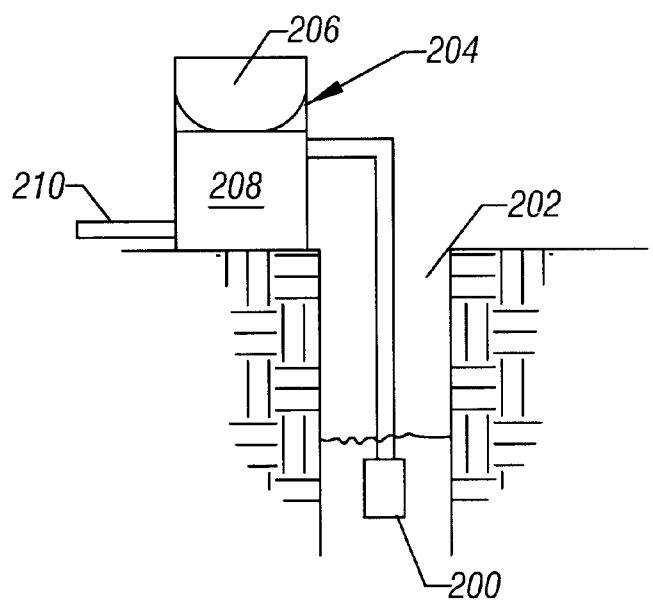
FIG. 8 is a schematic diagram of a well pump system according to an embodiment of the invention.

Referring to FIG. 8, as another example of a load that has a substantial potential energy may be a system that includes a well 202 and a well pump 200. The well pump 200 pumps water into a pressurized reservoir tank 204. In this manner, the pressurized reservoir tank 204 may house an air bladder 206, for example, that is compressed when water 208 is stored in the reservoir tank 204. Therefore, by temporarily disconnecting the water pump 200, water may still be supplied to a water outlet line 210 (of the reservoir tank 204) that furnishes water to the house, and residents inside the house may not notice a temporary disconnection of the water pump 200.

Figure 3:
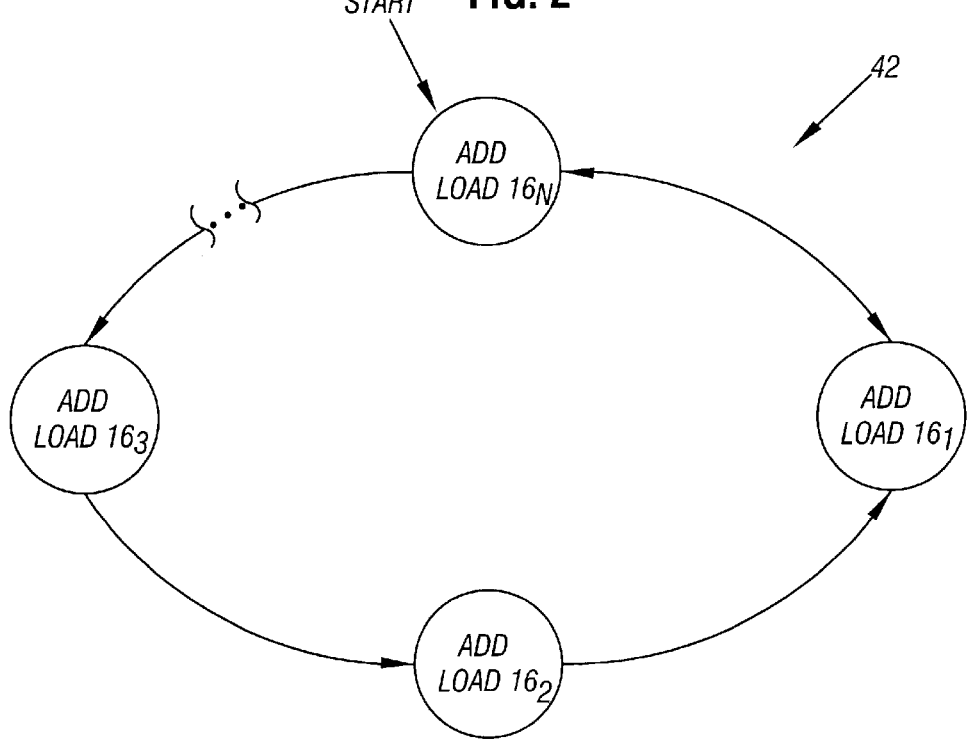
FIG. 3 is an illustration of a priority scheme for connecting loads to the electrical system of FIG. 1 according to an embodiment of the invention.

Referring to FIG. 3, for purposes of connecting the controlled residential loads 16 to the electrical system 10 when the fuel cell system 12 is producing output power that is less the $TH_L$ lower power threshold level (see FIG. 6), the fuel cell control circuit 15 may use a connection priority scheme 42. In particular, the connection priority scheme 42 may include connecting the controlled residential loads 16 in an order that is opposite to the disconnection order of the disconnection priority scheme 40, described above. In this manner, in the connection priority scheme 42, the controlled residential loads 16 may have the following connection priority (according to the reference numbers of the controlled residential loads 16, as listed from the top to the bottom connection priority in order): $16_N$, $16_3$, $16_2$, . . . $16_1$. Therefore, as an example, the fuel cell control circuit 15 may connect the load $16_3$ before the fuel cell control circuit 15 connects the load $16_2$.

Figure 4:
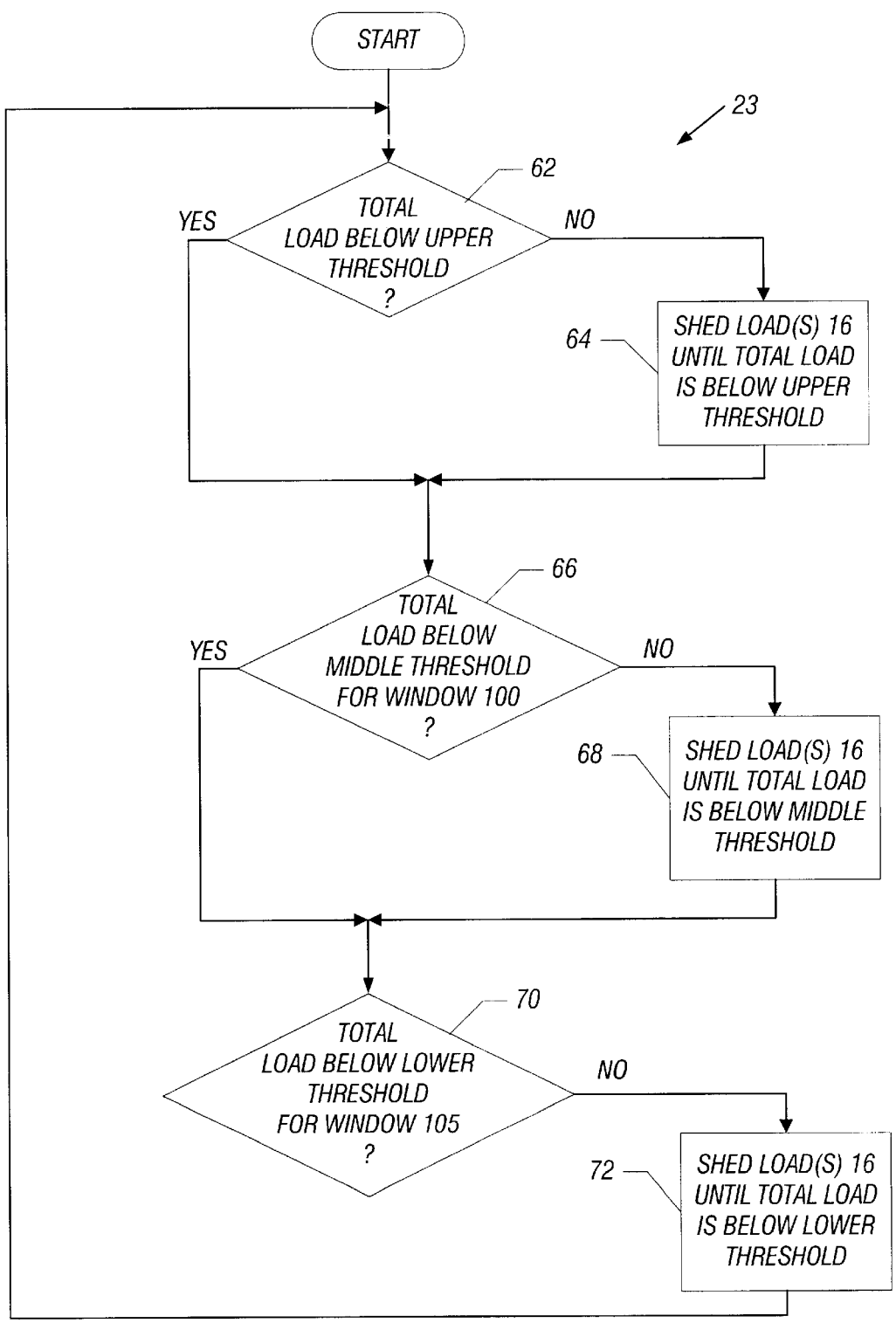
FIG. 4 is a flow diagram illustrating execution of a routine to shed loads of the electrical system of FIG. 1 according to an embodiment of the invention.

In some embodiments, the fuel cell control circuit 15 may be a processor-based (a microcontroller-based, for example) circuit that stores a program 19 that the fuel cell control circuit 15 executes to perform the above-described disconnection and connection of the controlled residential loads 16. For example, referring to FIG. 4, the program 19 may include a routine 23 that the fuel cell control circuit 15 executes to perform the shedding, or disconnection, of the controlled residential loads 16. In particular, the fuel cell control circuit 15 may determine (diamond 62) whether the output power is below the $TH_U$ upper power threshold level. If so, then the fuel cell control circuit 15 selectively disconnects (block 64) one of more of the controlled residential loads 16 (pursuant to the disconnection priority scheme 40 described above) until the power output of the fuel cell system 12 is below the upper power threshold level $TH_U$.

Next, the fuel cell control circuit 15 determines (diamond 66) whether the power output of the fuel cell system 12 is below the $TH_M$ middle power threshold level during a window 100 from a time when the output power exceeded the $TH_M$ middle power threshold level. If not, then the fuel cell control circuit 15 selectively disconnects (block 68) the controlled residential load(s) 16 until the power output of the fuel cell system 12 is below the $TH_M$ middle power threshold level. Subsequently, the fuel cell control circuit 15 determines (diamond 70) whether the power output is below the $TH_L$ lower power threshold level for a window 105 from a time when the output power exceeded the $TH_L$ lower power threshold level. If not, then the fuel cell control circuit 15 selectively disconnects (block 72) the controlled residential load(s) 16 until the power output of the fuel cell system 12 is below the $TH_L$ lower power threshold level. The routine 23 may cause the fuel cell control circuit 15 to return to the diamond 62 as long as the power is above the $TH_L$ lower power threshold level.

Figure 5:
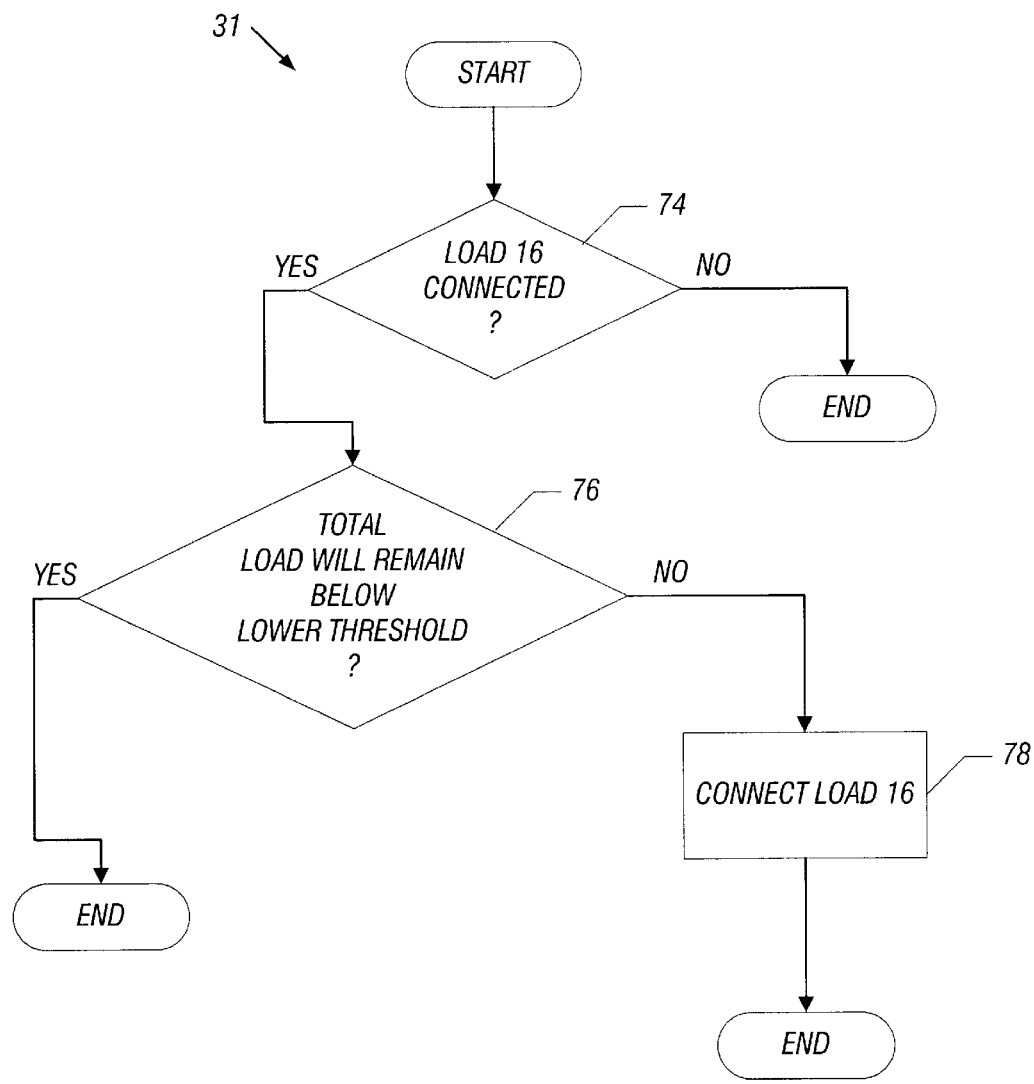
FIG. 5 is a flow diagram illustrating operation of a routine to connect loads to the electrical system of FIG. 1 according to an embodiment of the invention.

Referring to FIG. 5, for purposes of connecting the controlled residential loads 16 to the electrical system 10, the program 19 may include a routine 31. In particular, the routine 31, when executed, may cause the fuel cell control circuit 15 to determine (diamond 74), in accordance with the connection priority scheme 41, whether a particular controlled residential load 16 is connected. If so, the fuel cell control circuit 15 returns to diamond 74. Otherwise, the fuel cell control circuit 15 determines (diamond 76) whether the total output power of the fuel cell system 12 will remain below the $TH_L$ lower power threshold level when the targeted controlled residential load 16 is connected. The fuel cell control circuit 15 may make this determination by, for example, interacting with the associated circuit 24 to retrieve the most recent history of the controlled residential load 16. If the fuel cell control circuit 15 (based on the power history that is provided by the circuit 24) determines that the power output after connection of the targeted controlled residential load 16 will remain below the $TH_L$ lower power threshold level, then the fuel cell control circuit 15 connects (block 78) the targeted controlled residential load 16.

Referring back to FIG. 1, in some embodiments, the fuel cell control circuit 15 may further base the disconnection/connection on other criteria than assigned priority levels. For example, the fuel cell control circuit 15 may use one or more temperature sensors 17 to sense a temperature that is associated with the controlled residential load 16 and further base the connection\disconnection on the sensed temperature. For example, the fuel cell control circuit 15 may sense an air temperature inside the house and base the disconnection of an air conditioner (i.e., a controlled residential load 16 for this example) on the sensed temperature. In this manner, if the sensed temperature is below a predetermined temperature level, the fuel cell control circuit 15 may disconnect another controlled residential load 16 (instead of the air conditioner) that has a lower priority level. As other examples, the fuel cell control circuit 15 may use the temperature sensors 17 to sense the temperatures of water in a pool and water in a hot water heater and base connection/disconnection of a pool heater and a hot water heater on these sensed temperatures.

Figure 7:
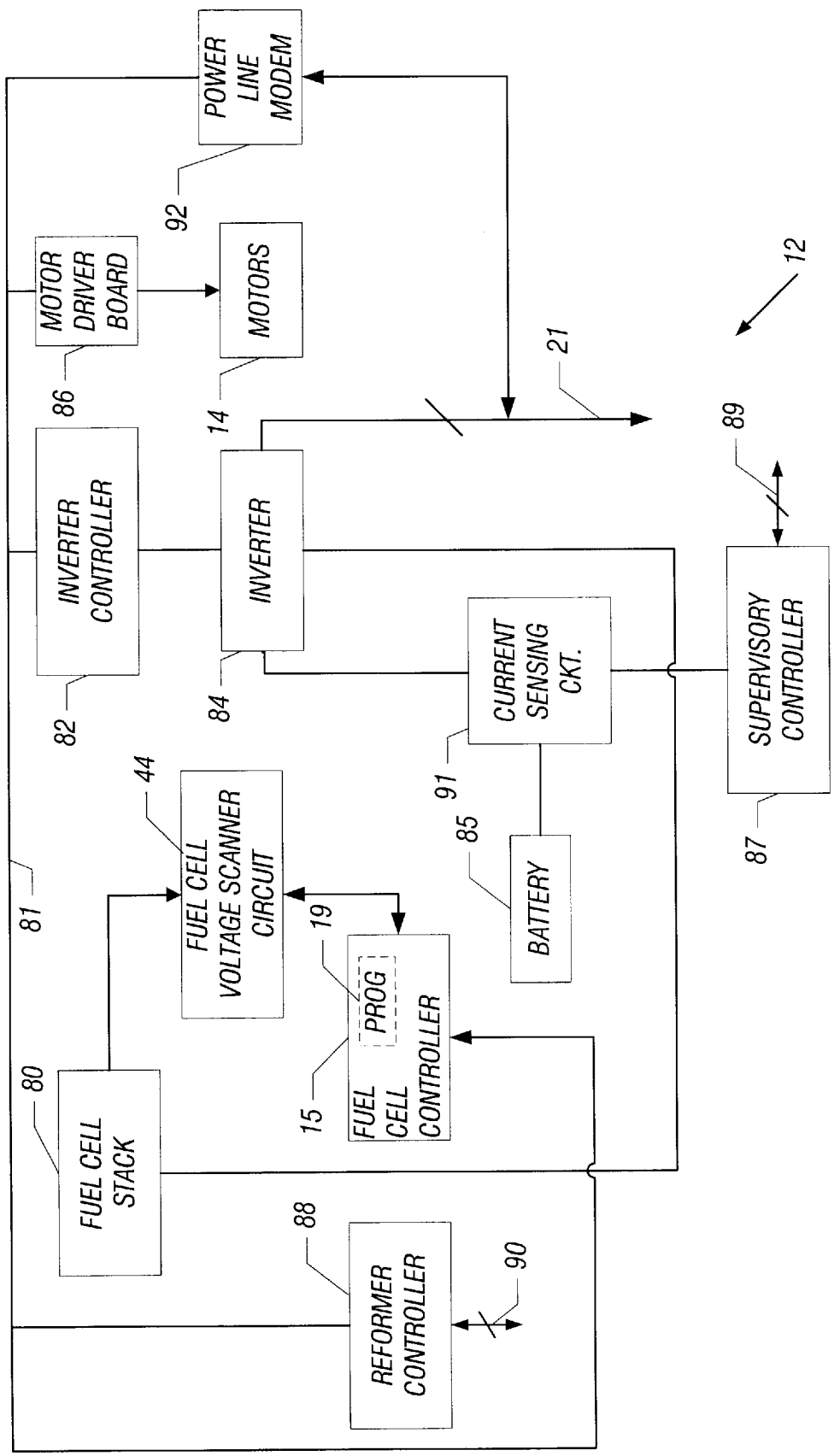
FIG. 7 is a schematic diagram of a fuel cell system of the electrical system of FIG. 1 according to an embodiment of the invention.

Referring to FIG. 7, in some embodiments, the fuel cell system 12 may include the fuel cell control circuit 15 that stores the program 19 (that includes the above-described routines 23 and 31) in a memory (an electrically erasable programmable read only memory (EEPROM) or a flash memory, as just a few examples) of the fuel cell control circuit 15. Copies of the program 19 may also be stored, as an example, on a mass storage device (a hard disk drive, for example) or on removable media (a floppy disk or an optical disk, as examples), as just a few examples.

The fuel cell system 12 also includes a fuel cell stack 80 that is electrically coupled to the power lines 21. In this manner, the fuel cell stack 80 furnishes DC power to an inverter 84 that furnishes AC power to the power lines 21. An inverter controller 82 may be coupled to the inverter 84 to monitor the power output of the fuel cell system 12 and may communicate the monitored power to the fuel cell control circuit 15 via a serial bus 81, for example. For purposes of establishing communication between the circuits 24 and the fuel cell control circuit 15, the fuel cell system 12 may include a power line modem 92. In this manner, the modem 92 may use a power line transmission protocol (an X-10 bus protocol, for example) to communicate with the circuits 24 via the power lines 21. A reformer controller 88 (that controls a reformer (not shown) via control lines 90) may be coupled to the serial bus 81 along with a motor driver board 86 that controls the motors 14.

Among the other features of the fuel cell system 12, the fuel cell control circuit 15 may monitor the voltages and currents of the fuel cell stack 80 via a fuel cell voltage scanner circuit 44. The battery 85 may be coupled to the inverter 84 so that the battery 85 is discharged during power output levels that exceed the $TH_L$ lower power threshold level (during the windows 100 and 105) and recharged otherwise. A supervisory controller 87 determines the energy that is currently stored in the battery 85 by monitoring the power that charges the battery 85 and the power that is depleted from the battery 85. One way that the supervisory controller 87 may accomplish this is to use a current sensing circuit 91 (that is coupled between the battery 85 and the inverter 84) to monitor the current to/from the battery 85. The supervisory controller 87 may include other control lines 89 that the supervisory controller 87 uses to coordinate the above-described activities of the fuel cell system 12.

Figure 9:
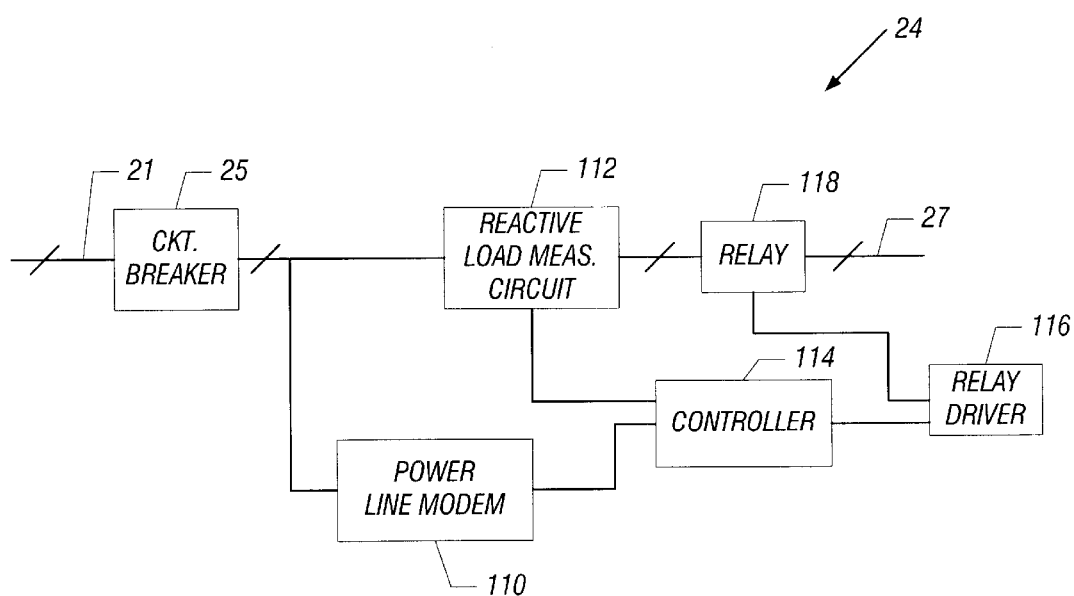
FIG. 9 is a schematic diagram of a load sense and switch circuit of the electrical system of FIG. 1 according to an embodiment of the invention.

Referring to FIG. 9, in some embodiments, the circuit 24 may be packaged to be installed in a breaker panel socket and may include the following circuitry. The circuit 24 may include a reactive power measuring circuit 112 that measures the power transmitted via the power lines 21 to the associated controlled residential load 16. A controller 114 (a microcontroller, for example) may be coupled to the circuit 112 to receive an indication of the load and communicate the results to the fuel cell control circuit 15 via a power line modem 110 that is coupled to the power lines 21. The power line modem 110 communicates with the power line modem 92 using the power line transmission protocol. In this manner, the fuel cell control circuit 15 may communicate via the power lines 21 and the power line modem 110 to the controller 114 to instruct the controller 114 to close the switch 29. The switch 29 may be formed from relay driver 116 and a relay 118. The controller 114 may interact with the relay driver 116 to open or close the relay 118 to disconnect or connect, respectively, the associated controlled residential load 16.

The circuit 24 may also include a current breaker switch 25 to disconnect the associated controlled residential load 16 if the current through the switch 29 exceeds a predefined current level. The current breaker switch 25 may also be opened or closed by a manual switch lever, for example.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
   a fuel cell subsystem adapted to provide power capable of being consumed by residential loads, the fuel cell subsystem being sized to provide power up to a first power threshold that is less than maximum power threshold capable of being consumed by the residential loads;
   switches; and
   a controller adapted to determine the power being consumed by the residential loads and based on the determined power, operate the switches to selectively regulate electrical connections between the residential loads and the fuel cell subsystem to keep the power approximately below the first power threshold,
   wherein the controller is further adapted to operate the switches to keep the power below a lower second threshold within a first predetermined window of time.

2. The system of claim 1, wherein the controller is further adapted to operate the switches to keep the power below a third threshold below the first and second thresholds within another predetermined window of time.

3. The system of claim 2, wherein said another predetermined window of time has a longer duration than the first predetermined time.

4. The system of claim 1, wherein the controller is further adapted to selectively open the switches to reduce the power.

5. The system of claim 4, wherein the controller selectively opens the switches based on a predetermined load disconnection priority scheme.

6. The system of claim 5, wherein the controller assigns a disconnection priority to each load based on a potential energy associated with the load.

7. The system of claim 6, wherein one of the loads comprises an air conditioner and the air conditioner has a high potential energy relative to the other loads.

8. The system of claim 6, wherein one of the loads comprises a water heater and the water heater has a high potential energy relative to the other loads.

9. The system of claim 6, wherein one of the loads comprises a well pump that pumps water into a pressure vessel and the well pump has a high potential energy relative to the other loads.

10. The system of claim 6, wherein one of the loads comprises an oven and the oven has a high potential energy relative to the other loads.

11. The system of claim 6, wherein one of the loads comprises an electric dryer and the electric dryer has a high potential energy relative to the other loads.

12. The system of claim 6, wherein one of the loads comprises a pool heater and the pool heater has a high potential energy relative to the other loads.

13. The system of claim 1, wherein the controller is further adapted to selectively close the switches to increase the power when the power is below the first threshold.

14. The system of claim 13, wherein the controller is further adapted to close one of the switches to increase the load if closing said one of the switches will not increase the power.

15. The system of claim 1, further comprising:
circuits, each circuit being associated with a different one of the loads and being adapted to indicate a power being consumed by the associated load.

16. The system of claim 15, wherein the controller further bases operation of the switches on the indications that are provided by the circuits.

17. The system of claim 1, further comprising:
circuits, each circuit being associated with a different one of the switches and being adapted to indicate whether the associated switch is open or closed.

18. The system of claim 17, wherein the controller further bases operation of the switches on the indications that are provided by the circuits.

19. The system of claim 1, wherein the loads comprise appliances.

20. The system of claim 1, wherein some of the loads are located inside a house.

21. The system of claim 1, further comprising:
additional residential loads that consume power from the fuel cell stack and are directly coupled to the fuel cell subsystem.

22. The system of claim 1, further comprising:
at least one temperature sensor being adapted to indicate a temperature associated with one of the loads,
wherein the controller bases operation of the switches on the indication from said at least one temperature sensor.

23. A method comprising:
using a fuel cell system to provide power to residential loads, the fuel cellsystem being sized to provide power up to a first power threshold that is less than maximum power threshold capable of being consumed by the residential loads;
determining the power being consumed by the residential loads; and
based on the determined power, operating switches to selectively regulate electrical connections between the residential loads and the fuel cell system to keep the power approximately below the first power threshold,
wherein the operating comprises operating the switches to keep the power below a lower second threshold within a first predetermined window of time.

24. The method of claim 23, wherein the operating further comprises operating the switches to keep the power below a third threshold below the first and second threholds within another predetermined window of time.

25. The method of claim 24, wherein said another predetermined window of time has a longer duration than the first predetermined time.

26. The method of claim 23, wherein the operating comprises selectively opening the switches to reduce the power.

27. The method of claim 26, wherein the opening comprises selectively opening the switches based on a predetermined load disconnection priority scheme.

28. The method of claim 27, wherein the opening comprises basing a load disconnection priority for each load on a potential energy of the load.

29. The method of claim 23, wherein the operating comprises selectively closing the switches to increase the power when the power is below the first threshold.

30. The method of claim 29, wherein the closing comprises closing one of the switches to increase the load if closing said one of the switches will not increase the power.

31. The method of claim 23, further comprising:
monitoring a power being consumed by each of the loads; and
indicating the monitored power.

32. The method of claim 23, further comprising:
sensing a temperature associated with one of the loads; and
basing operation of the switches on the sensed temperature.

33. An article comprising a storage medium storing instructions readable by a processor-based system to cause a processor to:
determine a power being consumed by residential loads, the power being furnished by a fuel cell system that is sized to provide power up to a first power threshold that is less than a maximum power threshold capable of being consumed by the residential loads,
operate switches to selectively regulate electrical connections between residential loads and a fuel cell system to keep the power approximately below the first power threshold, and
operate the switches to keep the power below a lower second threshold within a first predetermined window of time.

34. The article of claim 33, wherein the storage medium stores instructions to cause the processor to operate the switches to keep the power below a third threshold below the first and second thresholds within another predetermined window of time.

35. The system of claim 34, wherein said another predetermined window of time has a longer duration than the first predetermined time.

36. The article of claim 33, wherein the storage medium stores instructions to cause the processor to open the switches to reduce the power.

* * * * *